United States Patent [19]
Rothman et al.

[11] Patent Number: 5,484,461
[45] Date of Patent: Jan. 16, 1996

[54] METHOD FOR PRODUCING A LI(AL) ANODE FOR A LITHIUM BATTERY

[75] Inventors: Ulf Rothman, Skanör, Sweden; Jesper Malling, Odense, Denmark

[73] Assignee: Inclusion AB, Sweden

[21] Appl. No.: 778,875

[22] PCT Filed: Jul. 2, 1990

[86] PCT No.: PCT/SE90/00473
§ 371 Date: Dec. 30, 1991
§ 102(e) Date: Dec. 30, 1991

[87] PCT Pub. No.: WO91/01045
PCT Pub. Date: Jan. 24, 1991

[30] Foreign Application Priority Data

Jul. 6, 1989 [SE] Sweden .................................. 8902461

[51] Int. Cl.$^6$ ...................................................... H01M 4/04
[52] U.S. Cl. .............................. 29/623.5; 419/67; 429/140
[58] Field of Search ........................... 29/623.5; 429/218, 429/136, 140; 419/66, 67

[56] References Cited

U.S. PATENT DOCUMENTS

| 2,251,913 | 8/1941 | Brennan ................................ 429/237 |
| 2,754,348 | 7/1956 | Berchielli .............................. 429/211 |
| 4,011,372 | 3/1977 | Tomczuk et al. ...................... 429/218 |

FOREIGN PATENT DOCUMENTS

| 1049949 | 2/1959 | Germany. |
| 1484650 | 9/1977 | United Kingdom. |

*Primary Examiner*—Anthony Skapars
*Attorney, Agent, or Firm*—Laurence R. Brown

[57] ABSTRACT

A method for producing Li(Al) alloy anode comprises the steps of alloying Li and Al, grinding the formed alloy, pressing the powder around a current conductive thread and enclosing the anode element in a microporous separator material.

1 Claim, 2 Drawing Sheets

METHOD FOR PRODUCING A LI(AL) ANODE FOR A LITHIUM BATTERY

TECHNICAL FIELD

This invention relates to a method for producing a Li(Al) anode for a lithium battery, in which Li and Al are pyrometallurgically alloyed in inert atmosphere and the formed alloy after cooling is ground to a homogeneous powder.

TECHNICAL BACKGROUND

At the present time there is a growing interest for lithium batteries. The interest is not limited to primary batteries, which so far have been most common on the market, but is increasingly focused also on secondary batteries. Lithium metal is attractive as a battery anode material because of its light weight, high voltage, high electrochemical equivalence, and good conductivity.

However, the use of pure lithium as anode material creates numerous and difficult problems, which are well known in the art. Especially, the difficulty with rechargeability and low melting point should be mentioned. The safety problems with batteries having pure lithium negative electrodes can certainly not be neglected.

For improving the qualities of negative electrodes having lithium as the active material the use of different lithium alloys has been investigated. Especially the use of aluminum as host metal for the highly reactive lithium has been found to provide certain advantages, for example with regard to the absence of dendrite formation and a high melting point. The present invention accordingly relates to a new and improved method for producing a Li(Al) anode for use in a primary or secondary battery.

The production of a Li(Al) powder in the way set forth in the introduction above is known from GB-A-1 484 650, but this powder is then pressed on a current conductive mesh.

In Journal of Electrochemical Society, Volume 124, No 10, 1977, M. L. Rao et al, "Lithium-Aluminium Electrode", p 1490–1492, a method to sinter Li(Al) powder on current conductive grids is disclosed.

In Journal of Electrochemical Society, Volume 131, No 8, 1984, A. S. Baranski et al, "The Cycling Efficiency of Lithium-Aluminium Electrodes in Nonaqueous Media", p 1750–1755, the electrodeposition of lithium on aluminium or nickel wires is disclosed.

By US-A-4 011 372 it is known to east a Li(Al) alloy on a conductive substrate.

Also DE-A-1 049 949 regarding the production of a certain electrode by pressing active lead paste on a lead thread, followed by the step of providing the electrode with a separator should be mentioned as another example of the prior art.

All these publications fail to disclose any totally satisfactory method of practically producing a Li(Al) anode for a lithium battery with the properties and qualities now sought for.

THE INVENTION

Such a method is according to the invention obtained in that the Li(Al) powder produced in the way set forth above is pressed or extruded to an elongated anode element around a current conductive thread, preferably of nickel, and that the anode element is provided with an enclosure of microporous separator material.

The enclosure can according to a further aspect of the invention be provided in a least two different ways: A separator material sheet can be placed at either side of an anode complex, comprising anode elements and connector rails, and pressed and line welded around the separate anode elements. Alternatively and preferably, a plurality of separate anode elements at certain intervals on a current conductive thread is formed in a continuous process, including the provision of the enclosures of microporous separator material.

The utilized microporous separator material is quite sensitive. Accordingly, each anode element may be provided with a protective web or net outside the separator material, especially when the anodes are to be used for a secondary battery.

BRIEF DESCRIPTION OF THE DRAWINGS

The invention will be described in further detail below reference being made to the accompanying drawings, in which.

DETAILED DESCRIPTION OF PREFERRED EMBODIMENT

Figure 1:
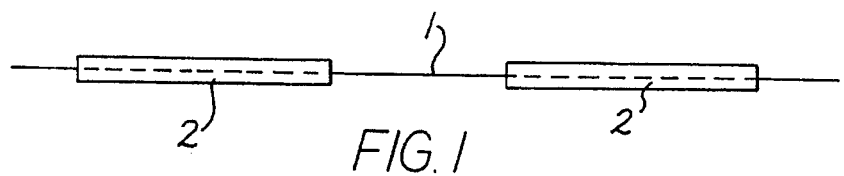
FIG. 1 illustrates a thread length with anode elements according to the invention thereon.

Generally speaking, the invention is described in its application to a liquid electrolyte lithium battery and especially a battery based on either of the following two lithium/sulphur dioxide systems:

1) $Li/SO_2+LiAlCl_4+C/C$

2) $Li/SO_2+LiAlCl_4/TiS_2$

These systems have the important advantages of providing high energy and power density. The first mentioned system is best suited for a primary battery, whereas the second one can also well be used for a secondary, i.e. rechargeable battery.

The reversible chemical reaction in a respective battery of any of these types has the following overall scheme:

1) $3Li+3C+3SO_2+LiAlCl_4 \leftrightarrows LiCl-Al(SO_2)_3-3C+3LiCl$

2) $Li+TiS_2 \leftrightarrows LiTiS_2$ (in this case $SO_2+LiAlCl_4$ is a pure electrolyte not participating in the reaction)

Due to the difficult problems with pure lithium as negative electrode or anode in any of these batteries the use of a host metal forming an alloy with the highly reactive lithium has been investigated. It has been found that the use of aluminium as host metal gives advantages, especially the absence of dendrite formation and a high melting point. Accordingly a lithium-aluminium alloy is used as anode in practical embodiments. Further aspects of this choice will be dealt with below, but already now it may be stated that an Li(A) alloy containing about 30 atom % Li is preferred in the second system due to its unique rechargeability.

With Li(Al) as anode a practical Cell voltage of 2.6 V is obtained in the first system and 1.8 V in the second system.

The cathode or positive electrode in a battery in the first system is a high surface carbon black in combination with the liquid $SO_2$-$LiAlCl_4$ complex. Carbon black has a two-fold function in the battery: it acts as a complex binder for the reduced form of $SO_2$ (cf the reaction formula above) and as an adsorbing agent for the $SO_2$-$LiAlCl_4$ complex but also as the current collector in the cathode. In order to satisfy the demands the carbon material should have a high surface area, high density, a great number of active sites for the complex binding and a good electric conductivity. It should further have a high porosity providing space for the reaction products.

Carbon black materials have been found to fulfil these requirements, and the presently preferred material is the commercially available product Ketjen Black from Akzo.

In the second system the cathode is electrically conducting $TiS_2$ or any other suitable metal sulphide, for example $V_2S_5$, $MoS_3$ etc.

The electrolyte is $6SO_2$-$LiAlCl_4$, which requires a pressure of some 2 atmospheres to become liquid. The electrolyte functions as an ion conductor in both systems and also as a depolarizer in the primary system, which poses special stoichiometric and physical-chemical requirements. Thus, the quantity of $SO_2$ is stoichiometrically twice as big as that of $LiAlCl_4$, which is necessary both to ensure that the electrolyte is liquid down to $-30°$ C. and has an adequately low viscosity and can avoid drying out at discharge in a primary system.

The separator in the battery shall effectively prevent electrical contact between anode and cathode but shall allow penetration of electrolyte and depolarizer. It shall in this case be able to contain or store certain amounts of electrolyte. A commercially available microporous polypropylene plastic film having up to 70% porosity, being free of pinholes and possessing good physical strength, has initially been used.

It can also be possible to use a polyethylene separator, but more promising results have been obtained with the copolymer material ethylene-tetrafluere-ethylene (ETFE). Practically, microporous Tefzel® (with a porosity of 40%) from Scimat Ltd, UK has been tested. The material is stable in the battery environment, whereas its physical strength is inferior to that of polypropylene.

As will appear more clearly below, the separator has the form of hollow fibres in the anode complex of the battery. Hollow fibres can also be used for the cathode.

Summarizing, the battery according to the invention works in the Li(Al)/$SO_2$ system. It has an anode of Li(Al) alloy in hollow fibre separator. In the primary battery the electrolyte/cathode is $LiAlCl_4$, $SO_2$ and C. The discharge process for this battery system comprises oxidation of lithium, reduction of sulphur dioxide and complex formation between electrolyte Salt, sulphur dioxide and carbon. In the secondary battery the cathode is $TiS_2$ or the like, whereas the electrolyte, which does not take part in the reaction, is $SO_2$ and $LiAlCl_4$.

The capacity of the first mentioned system is higher than that of the second one, but due to a certain risk for thermal run-away during charging of the first system it is only used for primary batteries.

A critical factor for the utilization of the anode electrode material in a battery is the active electrode surface. The cell power increases with increasing contact surface between electrode and electrolyte. In the present battery a large surface has been accomplished by the use of the so called "hollow fibre"—concept for the anode. This concept is revealed in WO-A-87/01516 and can be characterized in that the anode material is shaped as a cylinder or similar elongated body with optional cross-section and is encapsulated in an elastical, microporous separator material forming a hollow tube and that the anode elements are connected to an electrically conductive material (for example nickel) not taking part in the cell reaction. The cross-sectional dimension of the hollow tube or fibre is preferably less than 3 mm.

As already mentioned an anode material constituting about 30 atom % lithium in an alloy with aluminium has (together with the hollow fibre-concept) proven advantageous for a rechargable battery. The reasons can be summarized as follows:

this alloy shows only small volume changes during charging and discharging, the cylindrical shape enables volume changes to occur in two dimensions, so that the anode structure is not disintegrated, the separator design gives a physical compression, leading to an increased integrity for the anode structure during charge and discharge, and the Li(Al) alloy has a melting point over 600° C., which means that liquid and strongly aggressive lithium cannot be set free.

These factors are of special importance for the anode integrity, which is necessary to ensure that the anode material is rechargeable and secure.

The anode material can be manufactured in at least two different ways, namely either electrochemical loading of lithium into aluminium (electroforming) or pyrometallurgical fusion together of lithium and aluminium at a temperature of about 700° C. or more.

Although the first-mentioned method has certain advantages, the second one is presently preferred.

The fusion together of lithium and aluminium at 700° C. requires an inert atmosphere (argon), as both metals are aggressive relative to $O_2$ and $H_2O$ and to a lesser extent $N_2$. The molten alloy is cooled off, whereafter it is ground in dry atmosphere (preferably less than 2% humidity). The resulting powder can then be pressed (at a pressure of 6–10 ton/cm$^2$) in a hydraulic press around a central nickel wire to a parallelepipedical or cylindrical shape. An example of practical measurements are 1.4×1.8×50.0 mm. The anode is thereafter enclosed in a hollow fibre separator.

Further particulars about the procedure are given below.

As an alternative to pressing the powder into the desired shape a sintering process is feasible. Casting or extrusion is also possible.

In order to obtain the desired properties, for example with regard to high density, for the cathode material in the first system carbon black is mixed with Teflon® in proportions appr 80:20. In practice carbon powder, isopropanol, water and Teflon suspension is mixed. The mixture is extruded, dried and sintered. After finely dividing the cathode material it is pressed or rolled onto a current collecting net or the like, for example of nickel. The finished cathodes are enclosed in separator material of the same kind as used for the anodes.

In a practical case carbon cathodes with dimensions 50×15 mm and a thickness of 1–2 mm are made. They contain some 0.3–0.5 g carbon each and have a porosity of 75%.

The electrolyte as described above can be prepared in that equimolar amounts of LiCl and $AlCl_3$ are mixed in a pressure vessel, whereupon $SO_2$ is added.

So far the general properties of the different elements constituting the battery or cell in the Li(Al)/$SO_2$ system as well as their manufacture are described. Now the time has come to describe the physical construction of especially the anode.

Lithium may be deposited on metallic aluminium by electrochemical loading. As has already been stated, pyrometallurgical fusion together of lithium and aluminium into Li(Al) alloy is however preferred.

Examples of ways of constructing anodes containing such alloy is now described with reference to FIGS. 1 and 2.

The process of manufacturing powdered alloy followed by pressing or sintering this alloy on a conductive wire of for example nickel has been described above.

In an industrial process a conductive wire 1 (FIG. 1) can be stepwise fed through a press or sinter equipment and provided with anode elements 2 at intervals suitable for the following creation of complete anodes.

Figure 2:
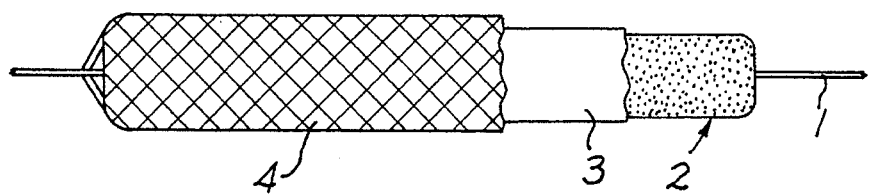
FIG. 2 shows an anode element to a larger scale.

Referring to FIG. 2, each anode element 2 may be provided with a separator 3 according to the "hollow fibre"-concept. Due to the comparatively low physical strength of the Tefzel® separator material it may be advantageous, especially if the battery is to be of the secondary type, to cover each anode element enclosed in separator material with a reinforcing web or net 4, preferably but not necessarily of the same material. In a practical case a number of filaments are braided directly on each element. The number of filaments may be fourteen.

Figure 3:
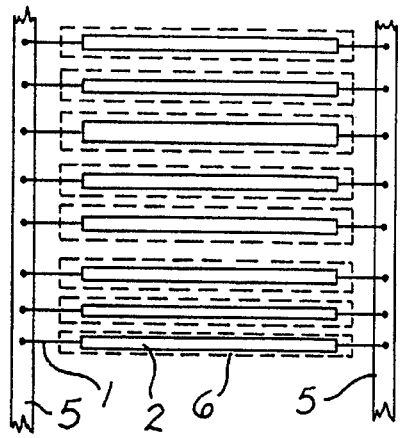
FIG. 3 is a plan view of an embodiment of an anode according to the invention.

After separation the anode elements 2 may be placed as cross-bars between two collector rails 5, as shown in FIG. 3, and their conductive wires 1 are attached to the collector rails 5 by soldering or the like. If the anode elements 2 are not already provided with separators time has now come to do so by pressing and line welding. The hollow fibre separators are indicated in FIG. 3 by reference numeral 6. Hereafter the formed anode ladder can be cut into desired lengths for the intended purpose.

As a variation of this embodiment, a certain length of a thread 1 provided with anode elements 2 (according to FIG. 2) can be laid in S-loops with the anode elements in parallel between the bends, whereupon two connector rails 5 are attached at the bends. Also, such a length of thread 1 provided with anode elements 2 can be wound around two connector rails 5 (placed at the desired distance from each other) and attached thereto so as to form the anode ladder of the type shown in FIG. 3.

Alternatives to the processes described above are possible. For example it would be possible to stamp out a complete ladder with cross bars and collector rails from a nickel sheet and then to provide it with anode elements by pressing or sintering as described above. Further, a comb-like structure for the anode is feasible. Also a grid of nickel or other conductive material could be provided with rod-like anode elements covered with separators for forming the hollow fibres.

Figure 5:
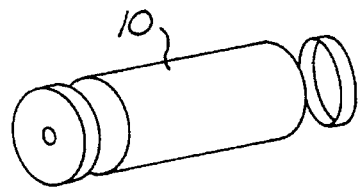
FIG. 5 illustrates this battery with two lids prior to their attachment.
Figure 4:
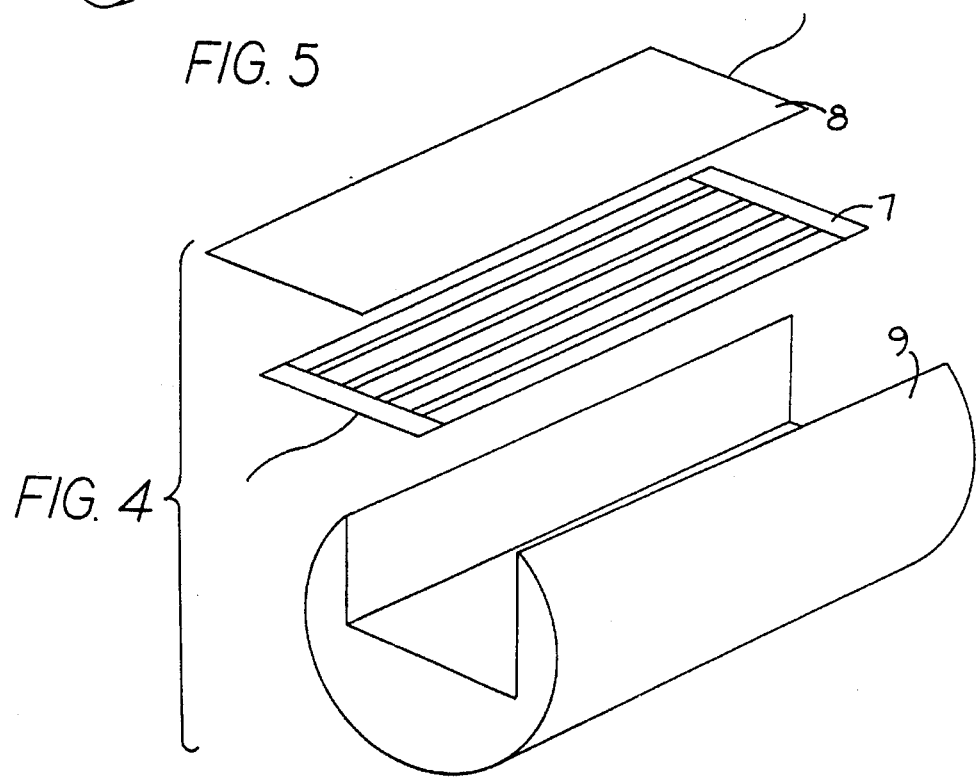
FIG. 4 is an exploded view illustrating the formation of a certain battery.

The construction of a practical primary cell or battery is shown in FIGS. 4 and 5.

A hollow fibre anode 7 and a carbon cathode 8 (possibly based on a nickel grid and enclosed in a separator material), both provided with current connectors, are placed in a suitable cavity in a carrier 9. Several anodes 7 and cathodes 8 may of course be stacked. The carrier 9 with its contents is placed in a battery container 10 with lids, to which the current connectors of the electrodes are connected. Prior to sealing electrolyte under pressure is added to the container.

Figure 6:
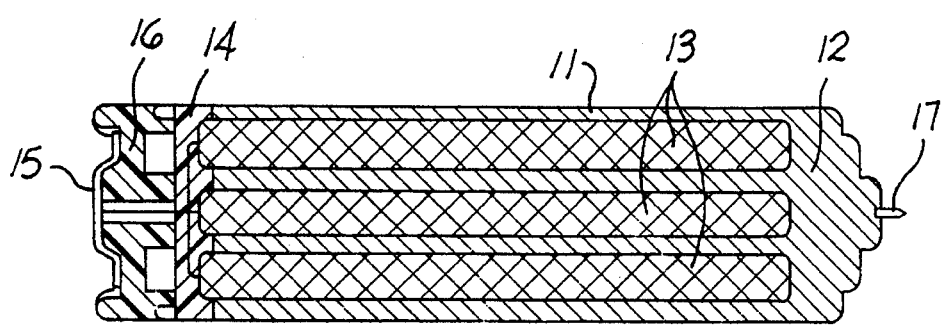
FIG. 6 is a cross-sectional view of another battery.

A practical embodiment of a secondary battery according to the invention is shown in FIG. 6. In a metal can or container 11 a shaped cathode 12 (of for example $TiS_2$) is placed. A number of Li(Al) anodes 13, for example of the type depicted in FIG. 2, are inserted in the cathode. The number of anodes may be seven: one central and six peripherally arranged. The threads or current connectors from the anodes 13 extend through a plastic spacer 14 to a metal lid or terminal 15, which is electrically parted from the container 11 by a plastic isolator 16. After mounting electrolyte may be introduced through a filling port 17 in the container 11; this port is thereafter permanently closed.

Other shapes and sizes of the final battery may of course be accomplished without difficulties.

Now a more detailed discussion of the Li(Al) alloy will be made.

Lithium forms alloys with aluminium in different metallurgical phases with different properties and patterns. Generally the different phases are as follows: alpha 0–10 atom %, alpha-beta 10–48 atom %, beta 48–60 atom %, and gamma 60–70 atom % of lithium in aluminium.

Aluminium as host material for lithium has some advantages and disadvantages (which are most relevant for a secondary battery but also to a certain extent for a primary battery).

1. The beta phase of lithium in aluminium has a reduced potential compared to lithium, which means that the alloy is less corrosive towards the electrolyte. Moreover, the lithium is actually dissolved in the aluminium leading to a lower aggressiveness than expected from the potential. Also the voltage from a battery is somewhat reduced (in the present case to about 2.8 V).

2. A lithium/aluminium anode is fully reversible in contrast to a pure lithium anode, which can suffer from surface deposition and loss of active material.

3. The melting point of the Li(Al) alloy is significantly higher than for pure lithium. This is a clear advantage because it eliminates the tendency to melt the lithium, forming a highly aggressive melt. At short-circuiting very high temperatures can result, and for this reason a high melting point is of great advantage.

4. Li(Al) alloy is somewhat brittle and can fall apart in conventional designs. This problem is in the present case overcome by placing the alloy in hollow fibres, which keep the anode grains in intimate contact ensuring sufficient electrical contact throughout the anode.

It has earlier been considered especially advantageous to utilize the cubic beta phase of the lithium/aluminium-alloy, existing in alloys containing 50 atom % lithium, due to its fast lithium diffusion coefficient, high melting point and low tendency to form dendrites at recharging. The problem encountered is that at cycling of such an alloy a dramatic loss of capacity occurs, as the structure collapses and the anode falls apart. Attempts to solve this problem with binding additives have not been completely unsuccessful, but the volumetric capacity of the anode has been reduced dramatically.

By the use of the hollow fibre concept it is possible to a certain extent to recycle a Li(Al) alloy without disintegration.

However, it has now been found that the volumetric capacity of a Li(Al) alloy in relation to the lithium contents in the alloy is of great interest for optimizing the results.

Figure 7:
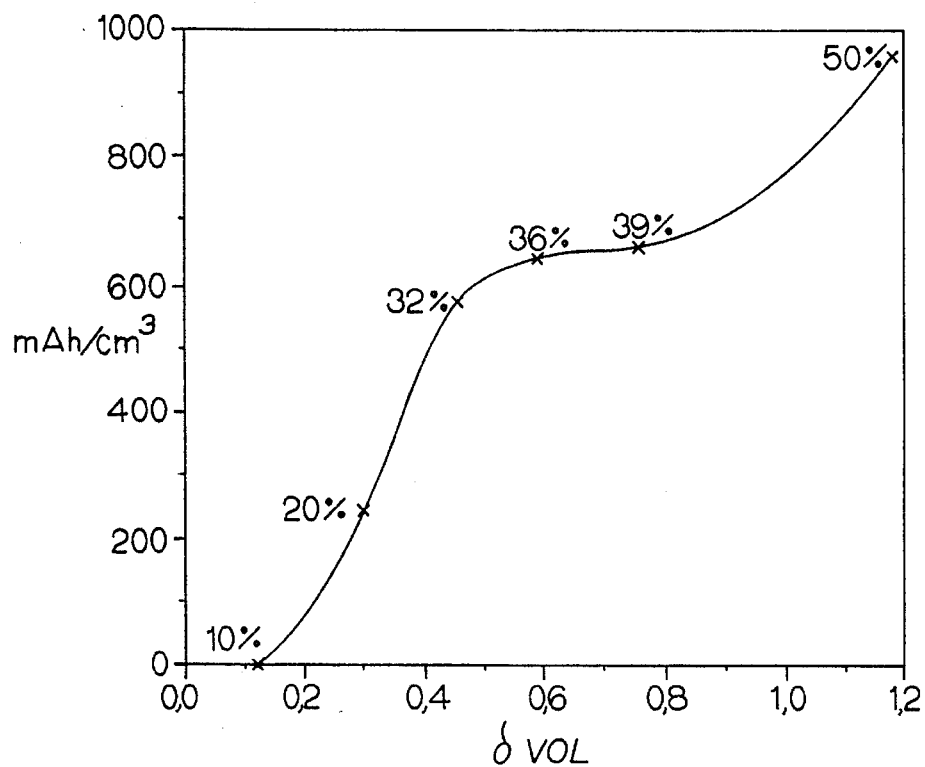
FIG. 7 is a graph showing the volumetric capacity of lithium versus the relative volume change of an aluminium host.

FIG. 7 is a graph showing the volumetric capacity of lithium stated in $mAh/cm^3$ of the mixed alpha beta phase of Li(Al) alloy versus tile relative volume change of the aluminum host.

The graph shows that up to appr. 30 atom % lithium in the alloy the capacity rises very quickly, whereas the volume change is modest; the inclination is in other words rather steep. Thereafter, especially up to appr. 40 atom % Li, the curve is much more level, which means that the capacity change is relatively low in comparison to the volume change.

At discharge of a Li(Al) alloy anode it is left in a more or less porous state depending on the discharge degree or depth. In other words the outer dimensions of the alloy do not change during discharge. The physical integrity of the discharged electrode is essential for the following charge and discharge steps, which means that volume changes should be minimized, to ensures host integrity and electrical conductivity. Optimum conditions would be no volume changes combined with a high intercalation degree of lithium. A compromise is a mixed alpha beta phase between 6 and 50 atom %, the preferred range being 10–32 atom % lithium, where the first figures indicate discharged state and the second ones charged state and where the remainder of the anode is essentially aluminium. Differently speaking it is not possible—using the mixed alpha betasphase of Li(Al) alloy—to obtain smaller volume changes with a corresponding Li-capacity than between 32 and 10 atom %.

The following examples illustrate the advantages in a secondary battery of a lithium content of appr 30 atom % in a Li(Al) alloy with regard to cyclability, energy density and energy output.

EXAMPLE 1

An electrochemical cell (7 cm$^3$) consisting of 2.7 g of 30 atom % Li(Al) alloy (surface area ca 65 cm$^2$) anode covered with a. microporous polypropylene separator, 8 g electrolyte (LiAlCl$_4$, SO$_2$ 1:6) and 1.5 g Ketjen black (15 weight % Teflon) cathode was assembled in sandwich fashion in an SS battery container. Leads and collectors were all, nickel. The cell delivered 300 cycles of 300 mAh (40% depth of discharge) at the discharge rate 500 mA; closed cell voltage 2.6 V, open cell voltage 2.8 V.

EXAMPLE 2

A comparable cell with a 50 atom % lithium anode replacing the 30 atom % anode of example 1 delivered under the same conditions 3 discharges. The anode was disintegrated.

EXAMPLE 3

A comparable cell with a 40 atom % lithium anode replacing the 30 atom % anode of example 1 delivered under the same conditions 15 discharges. The anode was disintegrated.

EXAMPLE 4

A comparable cell with a 20 atom % lithium anode replacing the 30 atom % anode of example 1 delivered under the same conditions 300 discharges with a reduced depth of discharge.

The following examples describe the general features in the manufacture of the desired alloys mentioned in the first four examples. Li(Al) alloys containing a mixed alpha beta phase is made by melting appropriate amounts of metals in a closed container. The alloy is solidified by cooling and then ground to 200 mesh, making the alloy fully homogeneous.

EXAMPLE 5

10 g of lithium (Lithco, 99%) and 90 g of aluminium (Merck, 99.9%) are placed in a stainless steel container and heated above the melting point 700° C. for 15 min. The resulting liquid is cooled to room temperature, and the resulting eutectic solid (mixed alpha beta phase) is ground to 200 mesh. This homogene alloy containing appr. 30 atom % Li and 70 atom % Al is pressed into anodes of desired shape and used in example 1.

EXAMPLE 6

7 g of lithium (Lithco, 99%) and 27 g of aluminium (Merck, 99.9%) are treated as in example 5. The resulting solid (pure beta phase) is ground to 200 mesh. This homogene alloy containing appr. 50 atom % Li and 50 atom % Al is pressed into anodes of desired shape and used in example 2.

The last example describes an alternative to the manufacture of the alloys of the first four examples. Here the Li(Al) alloy containing a mixed alpha beta phase is made by an electroforming process.

EXAMPLE 7

Aluminium (Merck, 99.9%) of the desired shape, covered with a polypropylene separator (Celanese, Hoechst), and lithium (Lithco, 99%) is dipped in an anhydrous electrolyte (i.e. 1 M LiCF$_3$SO$_3$ in THF, tetrahydroforan), and external electrical contact between Li and Al is established. When the desired lithium amount has been charged into the aluminium host, the anode is washed in anhydrous THF and is then ready for use in any of the examples 1–4.

The results so far obtained with laboratory cells based on the teachings above (hollow fibre concept, Li(Al)/SO$_2$ system and so forth) are promising. Thus the following data are typical of the achievements: energy density 275 Wh/l, power density 160 W/l, discharge current 7.5 mA/cm$^2$. The laboratory cells used have the dimension 50×16×9 mm.

In a primary battery other aspects of the lithium contents of the Li(Al) anode are more important than those referred to above. Accordingly, in such a battery the lithium contents may be as high as 80 atom %.

We claim:
1. Method for producing a Li(Al) anode for a lithium battery, in which Li and Al are pyrometallurgically alloyed in inert atmosphere and the formed alloy after cooling is ground to a homogenous powder, characterized in that the powder is pressed or extruded to form an elongated anode element (2) around a current conductive thread (1), which extends from at least one end of the anode element as a connector wire and in that the anode element is provided with an enclosure (3) of microporous separator material wherein a plurality of separate anode elements (2) at certain intervals on a current conductive thread (1) are formed in a continuous process, including the provision of the enclosures (3) of microporous separator material.

* * * * *